M. L. PARRET.
MOTION TRANSMISSION DEVICE.
APPLICATION FILED JULY 23, 1920.
1,415,690. Patented May 9, 1922.
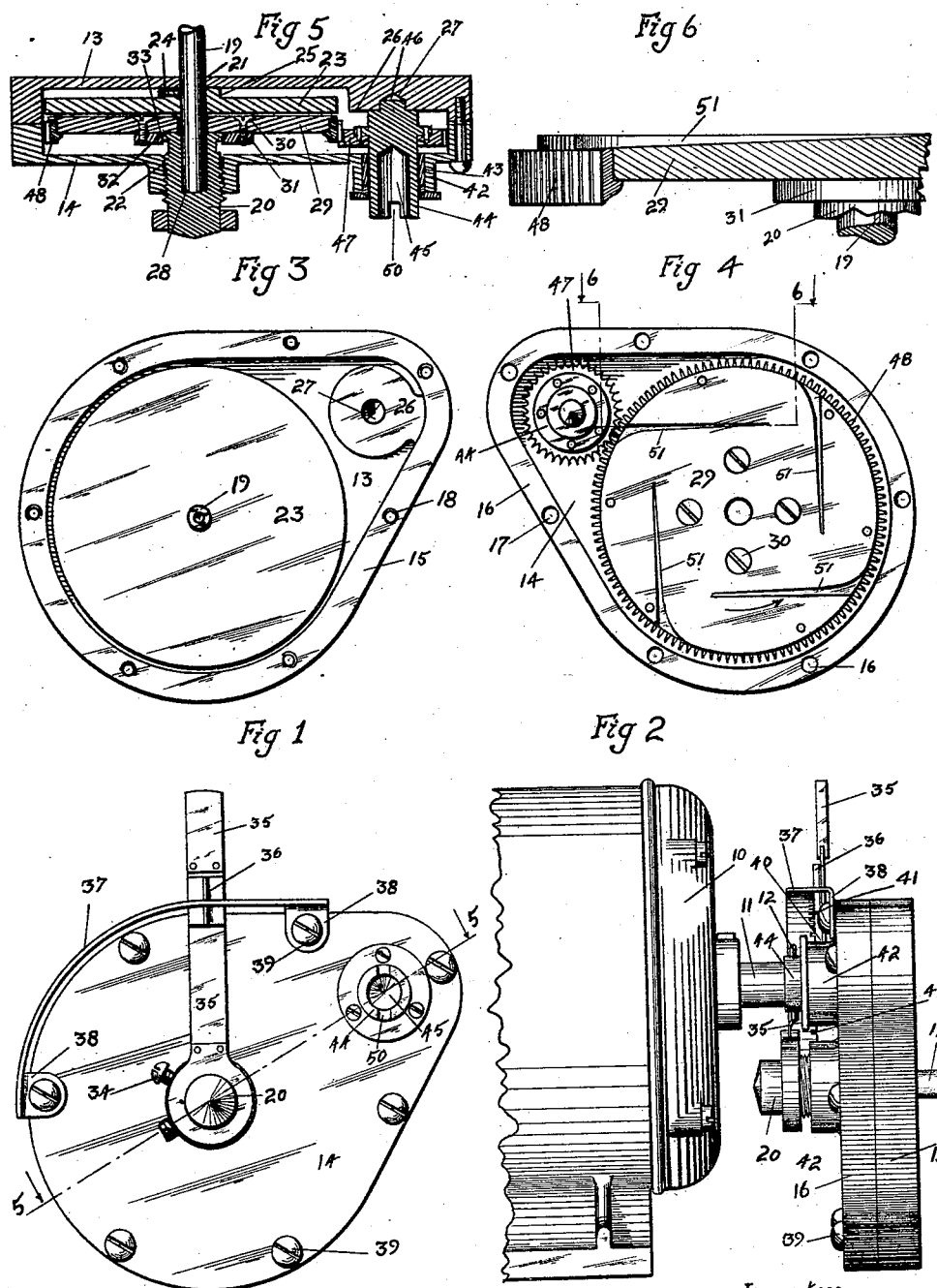
Witness
K. Patterson
Inventor
Milton L. Parret.
By Orwig + Bair Attorneys

UNITED STATES PATENT OFFICE.

MILTON L. PARRET, OF MARSHALLTOWN, IOWA.

MOTION-TRANSMISSION DEVICE.

1,415,690.   Specification of Letters Patent.   Patented May 9, 1922.

Application filed July 23, 1920. Serial No. 398,601.

*To all whom it may concern:*

Be it known that I, MILTON L. PARRET, a citizen of the United States, and a resident of Marshalltown, in the county of Marshall and State of Iowa, have invented a certain new and useful Motion-Transmission Device, of which the following is a specification.

My invention relates to a device for transmitting motion.

More particularly it is my object to provide a mechanism of simple, durable and inexpensive construction, adapted for transmitting motion from a prime mover to various kinds of mechanism, and including a pair of discs arranged with their faces adjacent to each other.

Still another object is to provide such a structure in which one or both of the discs is provided with grooves of certain kinds, as hereinafter more fully set forth.

Still a further object is to provide in such a device, a simple adjusting mechanism, whereby the tension on the discs with relation to each other may be regulated as may be desired.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of a motion transmission device embodying my invention.

Figure 2 shows a front elevation of the same.

Figure 3 shows a side elevation of one-half of the casing for the mechanism, with one of the discs installed therein.

Figure 4 shows a similar view, showing the other disc.

Figure 5 shows a detailed, sectional view taken on the line 5—5 of Figure 1; and Figure 6 shows a detailed, sectional view taken on the line 6—6 of Figure 4.

In the accompanying drawings, I have used the reference numeral 10 to indicate generally a prime mover, such for instance as an electric motor, having the power shaft 11, and provided near its end with a pin 12 projecting in opposite directions from the shaft.

I provide for my motion transmission device, a casing comprising the two casing members 13 and 14. The casing member 13 is provided with a peripheral flange 15, adapted to fit against a similar flange 16 of the casing member 14. The casing member 14, for instance, is provided with holes 17 to receive screw bolts, which are designed to be screwed into screw-threaded holes 18 in the flange 15 of the casing member 13.

The casing members 13 and 14 are provided with openings to receive a shaft 19 and an externally screw-threaded plug or the like 20. The hole in the casing member 13 is indicated by the character 21 and the hole in the casing member 14 is indicated by the reference character 22.

Within the casing member 13 on the shaft 19 is a smooth faced disc 23 fixed against rotation with relation to the shaft 19 by a set screw 24 or in any suitable way. The set screw 24 extends through a short hub 25.

On the interior of the casing member 13 is a smooth faced boss 26 in which is a socket 27.

The screw plug 20 has in its inner part a recess 28 to receive one end of the shaft 19. Received within the casing is a second smooth faced disc 29.

The smooth faces of the discs are arranged adjacent to each other, and it will be understood that the disc 29 is smooth faced with the exception of the grooves hereinafter mentioned.

Fastened to the outer face of the disc 29 by means of screws 30 is an annular ring or collar 31, having in its inner edge adjacent to the disc 29, a groove or rabbet 32. The inner end of the screw plug 20 is provided with an annular flange 33 received in the rabbet 32, whereby the screw plug 20 and disc 29 are connected together for relative rotation.

It will be seen that when the disc 23 is rotated, such rotation will be imparted to the shaft 19. It will also be seen that the pressure of the disc 29 against the disc 23 may be regulated by adjusting the screw plug 20.

On the outer end of the screw plug 20, there is secured by means of a set screw 34, a controlling lever 35 on which is mounted a short strip or plate 36. There is provided a curved bar or the like 37, which has ears 38, through which a pair of screw bolts 39 are extended. The screw bolts 39 are employed for securing together the casing members and two of these screw bolts hold the strip or bar 37 in position, as shown for instance in Figures 1 and 2.

The bar 37 has a slot 40 on one side of which are teeth 41 adapted to coact with the plate or strip 36.

The casing member 14 is provided with a hole extending away from which is an annular sleeve or bearing 42. Within the bearing 42 is a bushing 43. Extended through the bushing 43 is a shaft 44, having a hollow outer end, as at 45, and having its inner end pointed and received in the socket 27, as at 46.

Fixed on the inner end of the shaft 44 is a gear 47, which meshes with gear teeth 48 on the periphery of the disc 29. The outer end of the shaft 44 is provided with opposite notches 50 to receive the pin 12 when the end of the shaft 11 is inserted into the opening 45 in the shaft 44 for locking the shafts 11 and 44 against rotation with relation to each other.

In the surface of the disc 29 adjacent to the disc 23 are grooves 51.

It will be understood that the disc 29 is loosely mounted on the shaft 19 and rotates freely with relation to the plug 20. The grooves 51, just mentioned, are deeper at their outer ends at the periphery of the disc 29 and become gradually shallower at their inner ends.

These grooves are arranged on the lines of a segment of a circle, having its center at the center of the disc 29, as shown particularly in Figure 4.

I have heretofore secured a patent on a mechanism for transmitting motion, No. 1,302,701, issued May 6, 1919, and my present device relates to an improved form of a similar mechanism.

With many kinds of machinery, it is desirable to have what might be called a combined clutch and gearing connection, whereby motion may be transmitted from one moving device to another, and which is so constructed and arranged that the relative speeds of the driving and driven shafts, for instance, may be regulated, as desired, without the use of complicated gear shift structures.

It is also desirable in many instances that the so-called combined gearing and clutch connection should allow for slippage, in case an especially heavy load should suddenly be imposed upon the driven mechanism.

My present improved motion transmisison device complies with the above-mentioned requirements.

I have used my present structure on a moving picture machine for connecting the motor with the mechanism, whereby the film actuating devices and other working parts of the moving picture machine are operated.

In the practical use of my device, assuming that the shaft 19 is connected with an operative mechanism, and assuming that a suitable supply of lubricant is placed within the casing and that the motor is started, it will be seen that motion will be transmitted through the shaft 44 from the motor shaft and through the gear 47 to the disc 29, thence by the adhesion of the oil to the disc 23. By adjusting the lever 35, the screw plug 20 may be moved inwardly or outwardly for moving the disc 29 toward or from the disc 23 for thereby regulating the speed of the disc 23 with relation to that of the disc 29.

The lever 35 is of resilient material and is so arranged as to normally press the strip 36 into the notches 41 for holding said lever in any of its adjusted positions.

It will be noted, incidentally, that the lever 35 may be adjusted on the plug 20 by loosening the set screw 34.

I have found where using my device on a moving picture machine, that by adjusting the lever 35 to different positions of its movement, the machine may be adjusted to present from four to more than thirty film sections of pictures to the aperture plate each second and that the regulation of the speed of the machine can be accurately accomplished.

With two plain faced discs, satisfactory results can be secured, but I have found that the results are improved by using the grooves 51, substantially of the kind herein described. The disc 29 travels in the direction indicated by the arrow shown in Figure 4.

In a device of this kind, it is obvious that the oil between the discs tends to be thrown outwardly by centrifugal force. I have found that where the grooves, as shown, are used, there is always plenty of oil between the discs. The grooves during the rotation of the disc 29 scoop up the oil standing in the lower part of the casing and cause it to travel inwardly between the discs.

I have found that the results are better accomplished where the grooves are tapered somewhat as herein described with their larger ends at the periphery of the discs.

Some changes may be made in the arrangement and construction of the various parts of my device without departing from the real spirit and purpose of my invention and it is my intention to cover by my claims any modified forms of structure or use of mechanical equivalents, which may be reasonably included within their scope.

I claim as my invention:

1. In a device of the class described, a casing member, a shaft mounted therein, a disc fixed on said shaft, a second casing member secured to said first casing member; a short shaft mounted in the second casing member and journalled also in the first casing member, a gear between the casing members mounted on said second shaft, a plug mounted in the second casing member having an opening in its inner end receiving said first shaft, a disc loosely mounted on said first shaft and rotatably mounted on said plug, said plug having a screw-threaded connection with the second casing member, an adjusting arm on said plug, said second disc having teeth meshing with said gear.

2. A transmission device comprising a first and second casing member secured together, a shaft rotatably mounted in the first casing member, a plug having a screw-threaded connection with the second casing member and having an opening in which said shaft is journalled, a disc fixed on said shaft, a second disc loosely mounted on said shaft, having gear teeth at its periphery, means for rotatably but non-slidably mounting said second disc on said plug, a second shaft rotatably mounted in the second casing member and having one end journalled in said first casing member, a gear on said second shaft meshing with said teeth, said second shaft having on its outer end outside said second casing a clutch element.

3. In a device of the class described, a casing member, a shaft journalled therein, a disc fixed to said shaft and abutting against said casing member, a second casing member secured to the first casing member, a plug having a screw-threaded connection with said second casing member and having an opening in which said shaft is journalled, a disc adjacent to said first disc loosely mounted on said shaft, said plug bearing against said second disc, means for rotatably but non-slidably mounting said second disc on said plug, one of said discs having in its face adjacent to the other disc a plurality of grooves extending from the periphery of the disc inwardly, the walls of said grooves on the advancing side of the disc being curved away from the opposite walls of the grooves from the inner ends of the grooves outwardly.

Des Moines, Iowa, June 14, 1920.

MILTON L. PARRET.